United States Patent
Zarras (10) Patent No.: US 11,550,778 B2
(45) Date of Patent: Jan. 10, 2023

(54) SPREADSHEET WITH DYNAMIC DATABASE QUERIES

(71) Applicant: Goldman Sachs & Co. LLC, New York, NY (US)

(72) Inventor: Dean Andrew Zarras, Bedford, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 17/019,214

(22) Filed: Sep. 12, 2020

(65) Prior Publication Data
US 2021/0081405 A1 Mar. 18, 2021

Related U.S. Application Data

(60) Provisional application No. 62/900,434, filed on Sep. 13, 2019.

(51) Int. Cl.
| | |
|---|---|
| *G06F 16/248* | (2019.01) |
| *G06F 16/23* | (2019.01) |
| *G06F 16/245* | (2019.01) |
| *G06F 40/18* | (2020.01) |
| *G06F 16/28* | (2019.01) |

(52) U.S. Cl.
CPC ........ *G06F 16/2379* (2019.01); *G06F 16/245* (2019.01); *G06F 16/248* (2019.01); *G06F 16/283* (2019.01); *G06F 40/18* (2020.01)

(58) Field of Classification Search
CPC .... G06F 16/283; G06F 40/18; G06F 16/2428; G06F 16/24556; G06F 16/248; G06F 16/24553; G06F 16/245; G06F 16/2379; G06F 16/2457
See application file for complete search history.

(56) References Cited

U.S. PATENT DOCUMENTS

| | | | |
|---|---|---|---|
| 9,116,931 | B2 | 8/2015 | Zarras |
| 2007/0088691 | A1 | 4/2007 | Dickerman et al. |
| 2007/0168323 | A1 | 7/2007 | Dickerman et al. |
| 2015/0199378 | A1 | 7/2015 | Reyntjens |

(Continued)

FOREIGN PATENT DOCUMENTS

EP 2107474 A1 10/2009

OTHER PUBLICATIONS

PCT International Search Report and Written Opinion, PCT Application No. PCT/IB2020/058488, dated Oct. 26, 2020, 14 pages.

(Continued)

*Primary Examiner* — Marcin R Filipczyk
(74) *Attorney, Agent, or Firm* — Fenwick & West LLP (57) ABSTRACT

A spreadsheet supports formulas in cells that trigger queries of a data source. The parameters for queries can include or depend on values in other cells in the spreadsheet. Thus, the precise query submitted to the data source is dynamic, being dependent on the data and formulas in the spreadsheet. Furthermore, on receiving the query results, they are added to cells in the spreadsheet, which can be parameters for other queries defined in other cells. Changing the value of a single cell can automatically trigger an update of an arbitrarily deep hierarchy of calculations that can include an arbitrary number of data source queries.

14 Claims, 9 Drawing Sheets

(56) References Cited

U.S. PATENT DOCUMENTS

2016/0019281 A1\* 1/2016 Hariharan .......... G06F 16/2452
 707/783
2020/0089796 A1\* 3/2020 Seiden ............. G06F 16/24556

OTHER PUBLICATIONS

Microsoft, "Configure UDFs in Excel Online in Office Online Server," Dec. 3, 2019, three pages, [Online] [Retrieved on Sep. 21, 2020], Retrieved from the Internet<URL:https://docs.microsoft.com/en-as/office/client-developer/excel/configure-udfs-in-excel-online-in-office-online-server-preview>.
United States Office Action, U.S. Appl. No. 17/567,398, filed Mar. 18, 2022, 15 pages.

\* cited by examiner

```
┌─────────────────────────────────────┐
│  Receive a request to update a value or │
│  formula of a specified cell in a spreadsheet │
│                 310                 │
└─────────────────────────────────────┘
                  │
                  ▼
┌─────────────────────────────────────┐
│  Update the specified cell value or formula │
│                 320                 │
└─────────────────────────────────────┘
                  │
                  ▼
┌─────────────────────────────────────┐
│  Identify additional cells that depend on the specified │
│  cell to update and a dependency hierarchy │
│                 330                 │
└─────────────────────────────────────┘
                  │
                  ▼
┌─────────────────────────────────────┐
│  Update additional cells in the next │
│  level of the dependency hierarchy   │◄──┐
│                 340                 │   │
└─────────────────────────────────────┘   │
                  │                        │ Yes
                  ▼                        │
            ╱──────────╲                   │
           ╱ Is there additional level ╲───┘
          ╱ of the dependency hierarchy to update? ╲
           ╲            350            ╱
            ╲──────────╱
                  │ No
                  ▼
┌─────────────────────────────────────┐
│  Provide updated spreadsheet for display │
│                 360                 │
└─────────────────────────────────────┘
```

SPREADSHEET WITH DYNAMIC DATABASE QUERIES

CROSS REFERENCE TO RELATED APPLICATIONS

This application claims the benefit of U.S. Provisional Application No. 62/900,434, filed on Sep. 13, 2019, which is incorporated by reference.

BACKGROUND

1. Technical Field

The subject matter described relates generally to spreadsheets and, in particular, to a spreadsheet in which cells can query a database and dynamically update queries in other cells using the returned results.

2. Background Information

Spreadsheets provide a user-friendly way to view and analyze data. A typical spreadsheet is a two-dimensional matrix of cells divided into rows and columns. A user can enter data and formulaic relationships between the data into cells. For example, a simple spreadsheet might include a set of mortgage balances for a lender and a total of those balances. The total may be indicated in a cell that contains a formula for summing the values in the cells having the balances of the individual mortgages. Thus, if any of the individual balances are changed, the total balance may automatically update. However, as the amount of data and complexity of the corresponding relationships increases, such a spreadsheet becomes increasingly unmanageable. File size increases while system performance decreases, and the cause of errors resulting from bad data or formulas become increasingly difficult to identify and fix.

In contrast, relational databases store data in tables with rows and columns. Relational databases are configured to scale efficiently in both size and performance, allowing relatively rapid access to data from a large corpus. However, typical relational databases do not provide the intuitive, user-friendly interface of a spreadsheet. To identify specific data items, the user must define a query specifying one or more parameters of the desired data. The database system processes the query and returns all records in the database that match the specified parameters. Databases also have limited computational capabilities, often lacking those that the spreadsheet user expects to connect and analyze certain pieces of derived data in the context of others.

SUMMARY

The above and other problems are addressed by a spreadsheet that supports formulas in cells that trigger queries of a database. The parameters for queries can include or depend on values in other cells in the spreadsheet. Thus, the precise query submitted to the database is dynamic, being dependent on the data and formulas in the spreadsheet. Furthermore, on receiving the query results, they are added to cells in the spreadsheet, which can be parameters for other queries defined in other cells. Because the database queries are integrated with the spreadsheet's calculation engine, the other queries may be automatically updated, which may in turn further update additional queries. In other words, changing the value of a single cell may automatically trigger an update of all of an arbitrarily deep hierarchy of calculations that can include an arbitrary number of database queries. This architecture may provide users with the power of a spreadsheet interface while leveraging the power of databases to provide scalable and efficient data storage and access.

In one embodiment, a method for updating a spreadsheet includes receiving a request to update a specified cell that includes a value or formula for the specified cell. The specified cell is updated to include the value or formula. The method further includes identifying additional cells that depend on the specified cell, obtaining a dependency hierarchy for the additional cells, and updating the additional cells according to the dependency hierarchy. Updating a first cell of the additional cells includes dynamically defining a database query using a current value of another cell in the spreadsheet and updating the first cell to include a result returned by the database query. The method also includes providing the spreadsheet for display with the updated values and formulas for the specified cell and additional cells.

BRIEF DESCRIPTION OF THE DRAWINGS

FIGS. 4A-F are screenshots of an example user interface for interacting with a spreadsheet that includes an arbitrarily deep hierarchy of related database queries, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
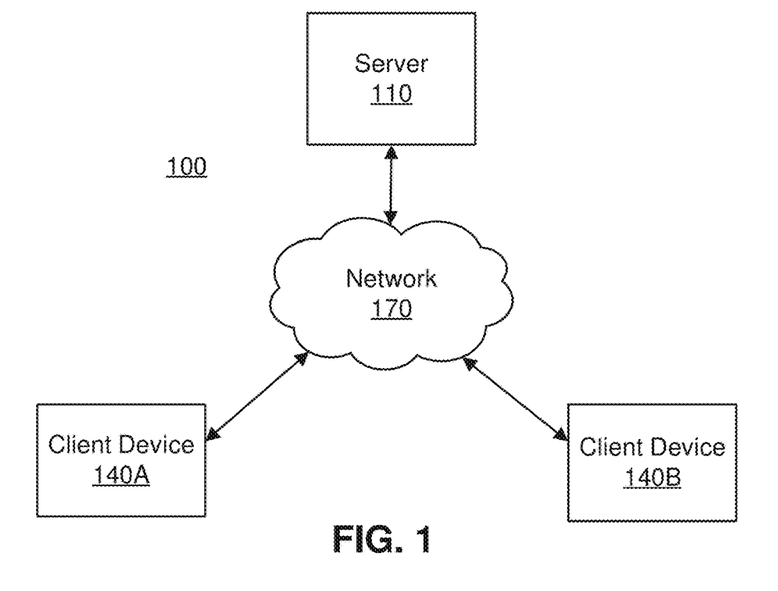
FIG. 1 is a block diagram of a networked computing environment suitable for providing a spreadsheet with dynamic database queries, according to one embodiment.

FIG. 1 illustrates one embodiment of a networked computing environment 100 suitable for providing a spreadsheet with dynamic queries to a scalable data source (e.g., a database). In the embodiment shown, the networked computing environment 100 includes a server, a first client device 140A, and a second client device 140B, connected via a network 170. In other embodiments, the networked computing environment 100 includes different or additional elements. In addition, the functions may be distributed among the elements in a different manner than described. For example, although two client devices 140 are shown, the networked computing environment 100 may include any number of such devices. Furthermore, although a client-server architecture is described, the functionality may be provided by a stand-alone computing system, which may or may not be connected to a network 170.

The server 110 is one or more computing devices that store and manage spreadsheets. For each spreadsheet, the server 110 stores the data and formulas contained within the cells. The server 110 may also store a dependency graph that indicates relationships between cells in a hierarchy. Thus, if the value of a cell is updated, the server 110 can identify other cells that will change as a result and automatically update those cells as well. The formulas in cells may define queries to a scalable data source (e.g., a relational database), which can depend on the data stored in other cells. To provide a simple example, a first cell may indicate a U.S. state while a second cell may include a formula that generates a query to determine the number of records in the data source relating to that state and displays that number in the second cell. If a user updates the state identified in the first cell, the query is automatically updated to reflect the new state and the displayed number changes to indicate the number of records relating to the new state in the data source. This new value may be used in defining further queries. Thus, a change in the value of a single cell can automatically propagate through an arbitrarily deep hierarchy of formulas in other cells, some or all of which may involve a data source query. Various embodiments of the server 110 are described in greater detail below, with reference to FIG. 2.

A client device 140 is a computing device configured to enable a user to access one or more spreadsheets managed by the server 110. Example client devices 140 include desktop computers, laptop computers, tablets, smartphones, and any other computing devices that may access and display a spreadsheet. In one embodiment, the client device 140 enables users to interact with spreadsheets via a user interface provided by the server 110. For example, users may access the user interface using a web browser. Alternatively, the client device 140 may include a dedicated application for interacting with spreadsheets stored by the server 110. In either case, assuming the user has appropriate permissions, they may view spreadsheets, edit data, and define formulas (including formulas that define data source queries) for cells in the spreadsheet.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
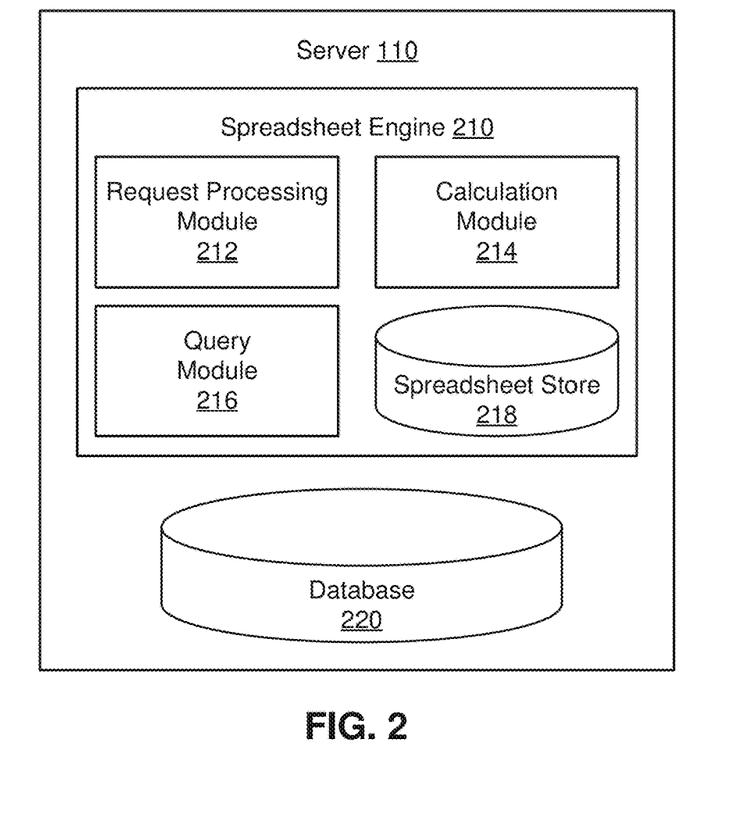
FIG. 2 is a block diagram of the server of FIG. 1, according to one embodiment.

FIG. 2 illustrates one embodiment of the server 110. In the embodiment shown, the server 110 includes a spreadsheet engine 210 and a database 220. The spreadsheet engine 210 manages one or more spreadsheets and includes a request processing module 212, a calculation module 214, a query module 216, and a spreadsheet store 218. In other embodiments, the server 110 includes different or additional elements. In addition, the functions may be distributed among the elements in a different manner than described.

The request processing module 212 processes user requests for actions relating to spreadsheets. In one embodiment, the request processing module 212 receives requests from client devices 140. If a request is to access a spreadsheet, the request processing module 212 provides some or all of the spreadsheet for display at the requesting client device 140 (e.g., by retrieving it from the spreadsheet store 218). If a request is to modify a value or formula in a cell, the request processing module 212 makes the requested modification and notifies the calculation module 214.

The calculation module 214 determines which additional cells (if any) are impacted by the requested modification. In one embodiment, the calculation module 214 maintains a calculation graph that indicates the relationships between cells that influence each other in a hierarchy. For example, cells that directly depend on the value of a cell are referred to as first-generation children of that cell, while cells that directly depend on the value of a first generation-child are referred to as second-generation children, and so on. Similarly, cells that impact the value of a cell are referred to as its first-generation parents, while cells that are relied on to determine the value of first-generation parents are referred to as second-generation parents, etc.

Using the calculation graph, when a requested modification is made to the value or formula of a cell, the calculation module 214 can identify additional cells to update by determining which cells have a formula that is influenced by the requested change (either directly or indirectly). In other words, the calculation module 214 can identify the child cells of the updated cell (of any generation). The calculation module 214 iterates through the generations of child cells, starting with the first generation, and updates them to reflect the changes resulting from the user request. For those child cells that have simple calculation formulas (i.e., those that do not involve querying the database 220), the calculation module 214 can reevaluate the formula using the data in the spreadsheet. In contrast, if a child cell has a formula that involves a database query, the calculation module 214 passes it to the query module 216.

The query module 216 builds a query using the formula of the cell it is evaluating and whatever other data in the spreadsheet the formula refers to. For example, the formula might be to retrieve records for the N highest assessment mortgages in state X, where N is the number in a first cell and X is the state identified in a second cell. Thus, a user can modify the query by changing the first and second cells, without editing the formula. In one embodiment, formulas in the spreadsheet are formatted using a syntax that is familiar to experienced spreadsheet users and may use functions for operations such as summing, averaging, sorting, and filtering inputs from other cells. The query module 216 generates a query in a database query language, such as structured query language (SQL) from the formula and cell values to which it refers.

The query module 216 queries the database 220 using the generated query and imports the returned results into the spreadsheet. In one embodiment, assuming the returned results are a set of records (rows) each including multiple attributes (columns), the query module 216 inserts them into the spreadsheet as values for a block of cells with the same number of rows and columns starting with the first parameter of the first record (i.e., the top-left corner of the block of results) in the cell that includes the formula. However, any appropriate or desired location for the block of cells relative to the cell with the formula may be used. As noted previously, the values in one or more cells in the block may impact a query defined in another formulas. In which case, the calculation module 214 will automatically identify that formula and pass it to the query module 216. The query module 216 then automatically generates an updated query, queries the database, and imports the results, which may lead to further automatically updated queries in an arbitrarily deep hierarchy of interrelated queries.

The spreadsheet store 218 is one or more computer-readable media that store the spreadsheets. In one embodiment, for a given spreadsheet, the spreadsheet store 218 includes the values and formulas entered for the cells separated by a first delimiting character (or set of characters) between columns and a second delimiting character (or set of characters) between rows. The spreadsheet store 218 may also include the calculation graph for the spreadsheet.

The database 220 is similarly stored on or more computer-readable media. In one embodiment, the database 220 is a relational database, but other forms of scalable data source may be used, such as NoSQL databases and API implementations that allow abstractions (e.g., PRESTO™). Although the database 220 is shown as a single entity that is part of the server 110 for convenience, a spreadsheet may include formulas that query multiple databases, some or all of which may be stored by different devices and accessed remotely (e.g., via the network 170). Therefore, any reference to the database 220 should accordingly be understood to include multiple databases as well as databases hosted by multiple devices, such as distributed databases.

Example Methods

Figure 3:
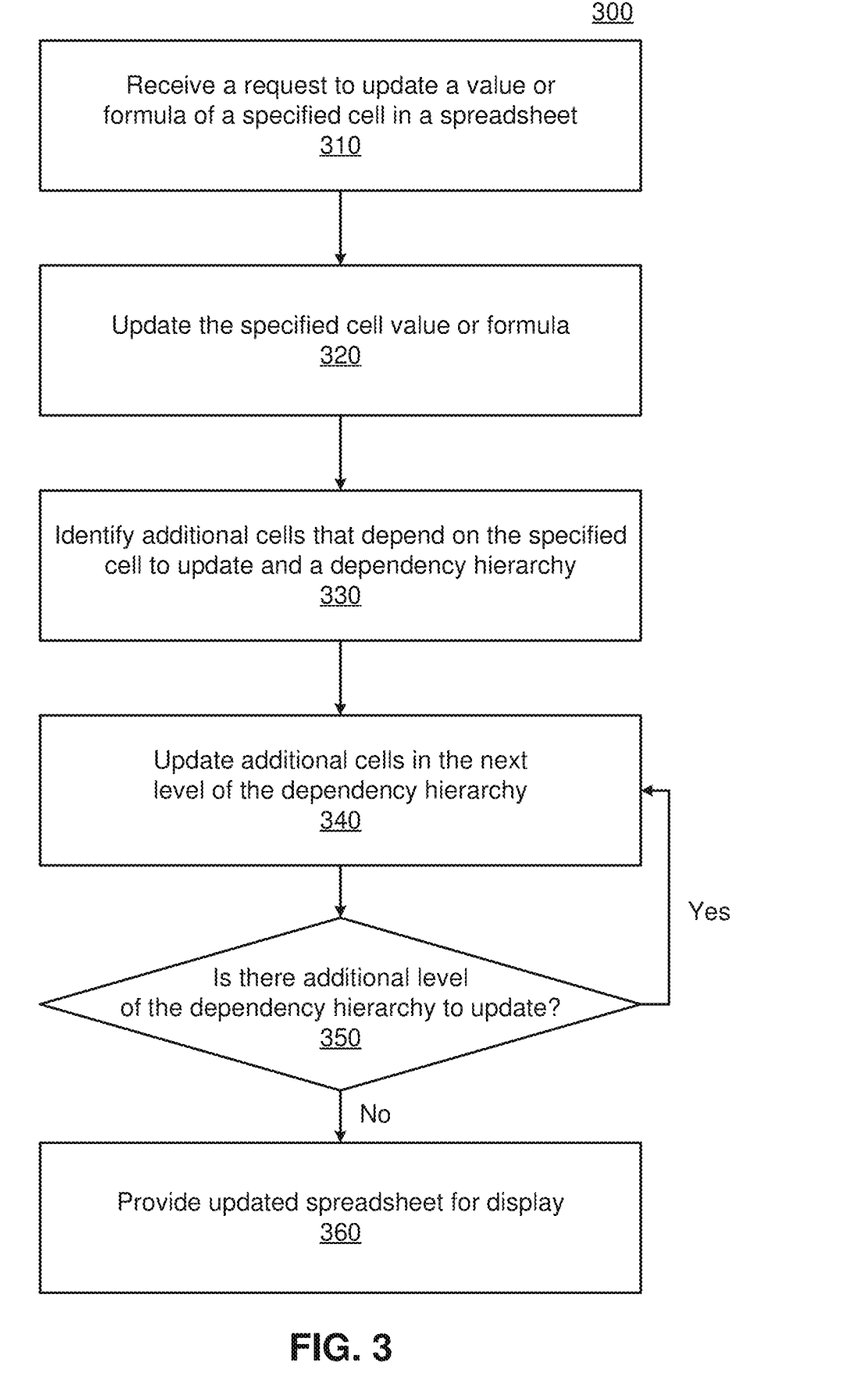
FIG. 3 is a flowchart of a method for updating a spreadsheet that includes an arbitrarily deep hierarchy of related database queries, according to one embodiment.

FIG. 3 illustrates a method 300 for updating a spreadsheet that includes an arbitrarily deep hierarchy of related database queries, according to one embodiment. The steps of FIG. 3 are illustrated from the perspective of the server 110 performing the method 300. However, some or all of the steps may be performed by other entities or components. In addition, some embodiments may perform the steps in parallel, perform the steps in different orders, or perform different steps.

In the embodiment shown in FIG. 3, the method 300 begins with the server 110 receiving 310 a request including a new value or formula for a specified cell in a spreadsheet. For example, the request may be generated by a client device 140 in response to a user providing a new value or formula for a specified call via a user interface of the client device. Alternatively, the request may be generated by the same device that hosts the spreadsheet (e.g., in the case of a standalone, non-networked implementation).

The server 110 updates 320 the value or formula of the specified cell in the spreadsheet and identifies 330 additional cells to update. The additional cells are those that are impacted by a formula that depends on the cell specified in the request. The server 110 also determines a dependency hierarchy, meaning which of the additional cells are first-generation children, second-generation children, etc., relative to the specified cell. In one embodiment, the server 110 identifies 330 the additional cells and the dependency hierarchy from a pre-existing calculation graph of the spreadsheet (e.g., stored in the spreadsheet store 218). Alternatively, the server may partially or completely identify 330 the additional cells on the fly by parsing the formulas in the cells.

The server 110 updates 340 any first-generation children of the specified cell. As described previously, one or more of the first-generation children may include a formula that involves a database query that depends on the value of one or more other cells in the spreadsheet. Any such database queries can be dynamically generated based on the current values of the relevant cells in the spreadsheet and the results of executing the queries on the database 220 are imported into the spreadsheet. The server 110 checks 350 whether there is an additional level of the dependency hierarchy to update (in this case, whether there are any second-generation children) and, if so updates 340 the additional cells in that level of the dependency hierarchy. This process iterates until there are no additional levels in the dependency hierarchy left to update.

The server 110 provides 360 the updated spreadsheet for display. In one embodiment, the server 110 sends updated values and formulas for cells to the client device 140 from which the update request was received 310 so the results of the requested updated can be displayed to the user. The server 110 may provide all of the updates at once, at all levels of the dependency hierarchy, or provide updated cell values and formulas as they are generated. The former approach ensures that the user can see all of the impacts of the requested change at once while the latter may provide a better user experience if there are a large number of complex changes as the immediate effects will be displayed while more remote effects (i.e., changes to higher-generation children) are still be calculated.

Example User Interface

FIGS. 4A-F illustrate an example user interface for interacting with a spreadsheet that includes an arbitrarily deep hierarchy of related database queries, according to one embodiment. The example user interface is for a spreadsheet relating to mortgage data, but it should be recognized that the disclosed architecture and techniques may be used for spreadsheets including a wide range of data.

Figure 4A:
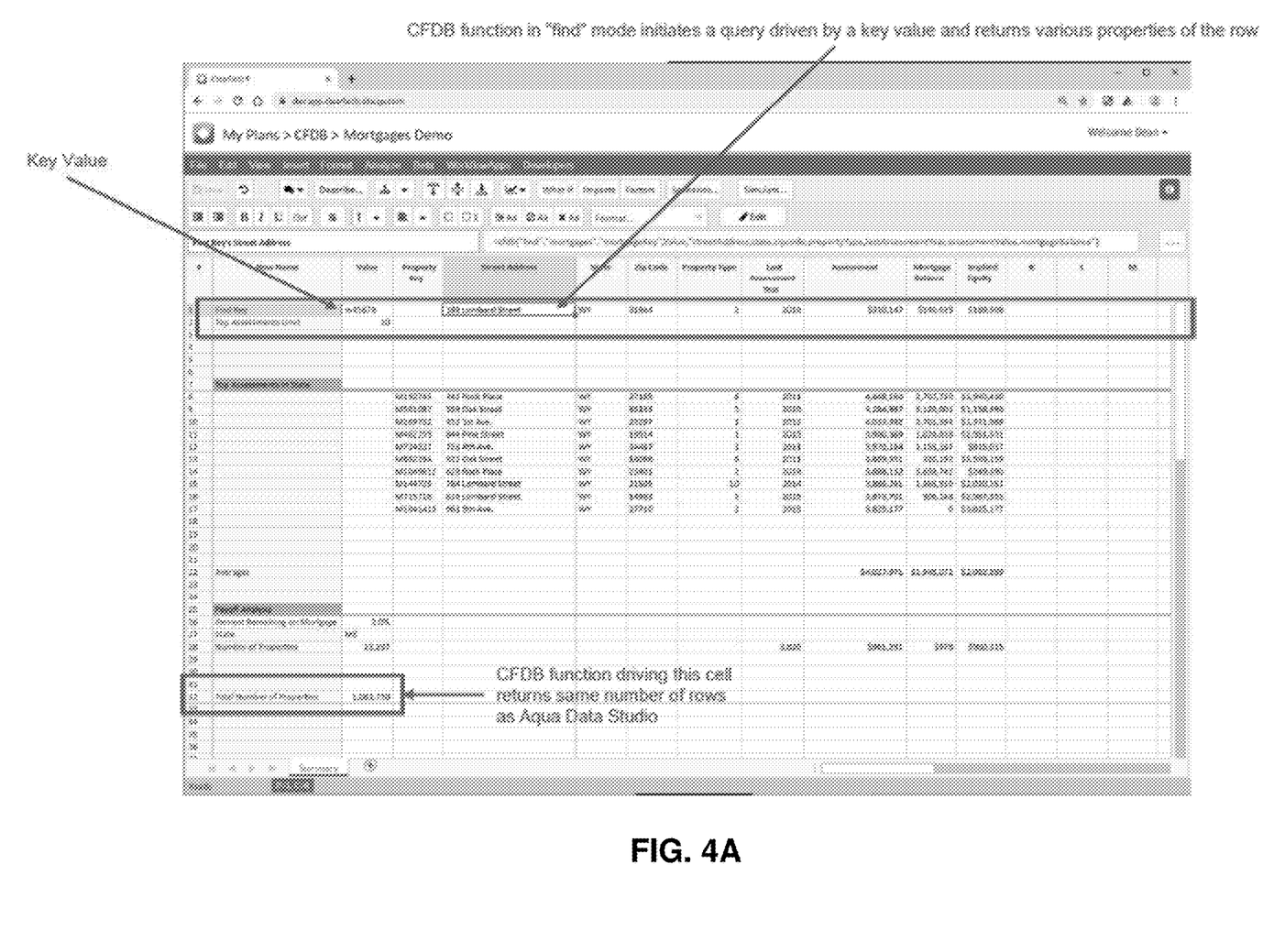

FIG. 4A shows a view of a subset of the mortgage data in a database. In this case, the database includes information about mortgages on over one million properties, but only a small proportion of that data is currently displayed. The user has selected a cell in the first row that displays a street address. It can be seen that the cell's value is defined using the CFDB( ) function, which is an example function for defining a database query.

In one embodiment, the CFDB( ) function has two modes, find mode and select mode. In other embodiments, the CFDB( ) function may have different or additional modes, each having their own syntax.

In "find mode," the syntax used is CFDB("find", "mortgages", "mortgagesKey", Value, <comma-separated-field-list>). "Find" is the mode of the query. "Mortgages" is the name of the single (e.g., no joins allowed here) database table to be queried. "MortgagesKey" is the name of the "single field primary key" field in the mortgages table that will be queried. The database 220 will typically have a unique index on this column. Value is a reference to another cell in the spreadsheet—hence the dynamic nature of the query in response to changes in other cells. In the example shown in FIG. 4A, the key is the mortgage "property key," which in the depicted example has the value of "m45678." The last parameter is a comma separated list of columns in the "mortgages" table whose values will be returned to the spreadsheet. In one embodiment, the "find mode" causes the function to return a single result row. In other embodiments, the "find mode" may return results from multiple rows.

In select mode, the syntax used is CFDB("select", <comma-separated-field-list>, <comma-separated-database-table-list>, <arbitrarily complex WHERE/ORDER/GROUP-BY clause>). "Select" is the mode of the query. The "select mode" is intended for cases where more than one result row is expected (but it could be a single row). "Feld list" can identify columns from any of the tables referenced in the third function argument, and can include mathematical operations on the data as performed by the database engine, such as SUM, MIN, MAX, etc. In the latter cases, there might be a corresponding GROUP BY clause, specified within the fourth function argument. "Table list" identifies the tables required to satisfy the query. The tables may be aliased with single letters or other short names to make the syntax easier to follow, and/or to qualify otherwise ambiguous column references. The last parameter can include join clauses between the tables (thus turning the tables into an ad-hoc "view"), filtering syntax that can be programmatically derived from other values in the spreadsheet (such as the state value coming from the "find" value in the first example), and other result set aggregators, filters or limiters, such as GROUP BY, HAVING, ORDER BY, LIMIT, etc.

In FIG. 4A, the CFDB( ) function is being used in find mode, which initiates a query driven by a key value and returns specified properties of the identified row. In this case, the user has entered the key value m45678 and the query has returned a street address (in the selected cell) and additional information from the row (the state and ZIP code, the property type, the last assessment year, the assessment amount, the mortgage balance, and the implied equity) arranged in cells to the right of the selected cell.

Figure 4B:
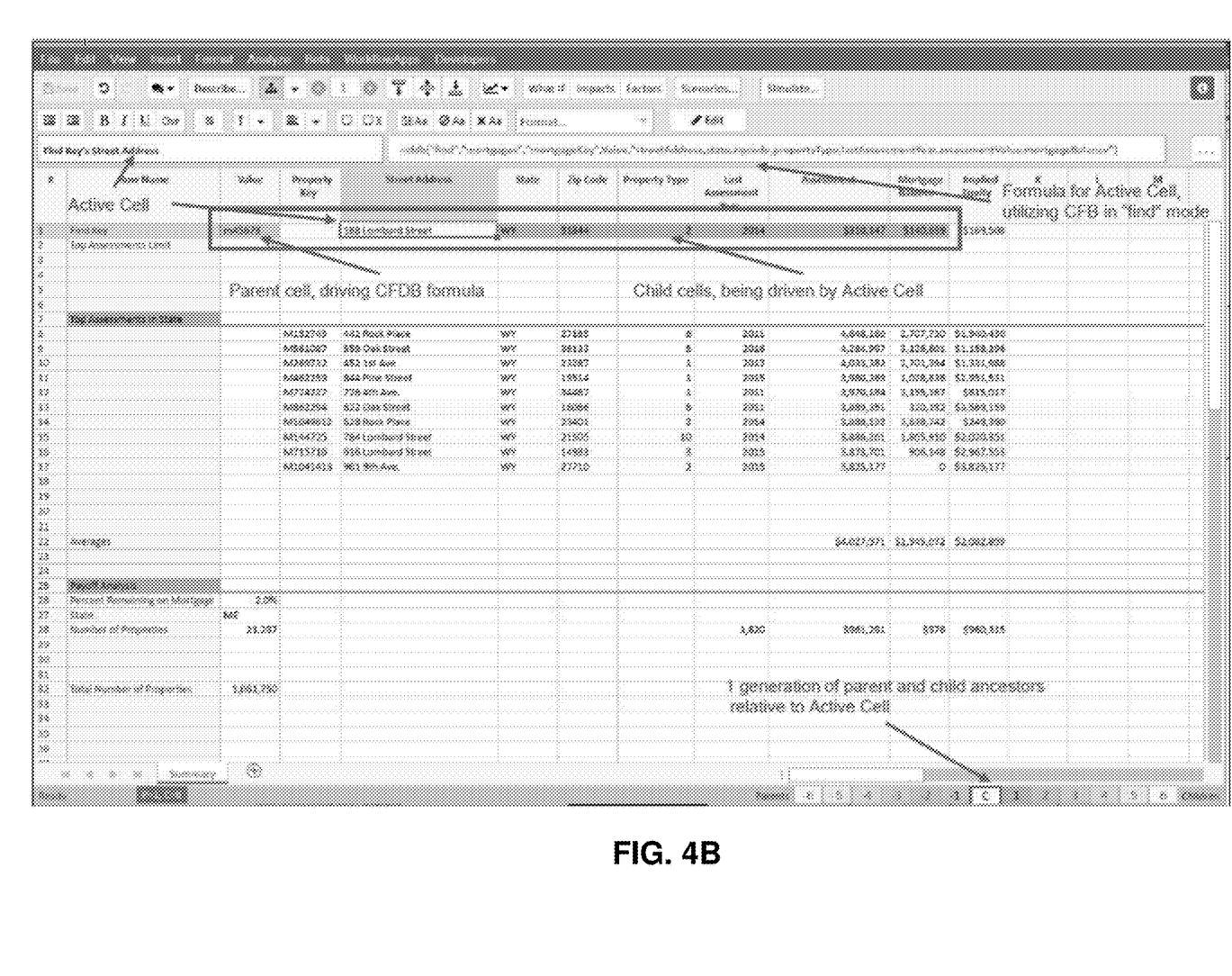

In FIG. 4B, the first-generation children and parent cells of the selected cell have been highlighted. In particular, the key value is identified as a first-generation parent cell (because its value impacts the query in the selected cell) and the cells containing the additional information from the row are identified as first-generation children (because their values are generated directly by the query in the selected cell). Any appropriate graphical indictors may be used to highlight these cells, such as fill color, fill intensity, outline color, outline intensity, fill pattern, etc. In one embodiment, the user interface includes controls for the user to select how many generations of children and parent cells to highlight. The graphical indictors may also be customizable by the user (e.g., the user may be given options to select which fill colors correspond to which generations of child and parent cells).

Figure 4C:
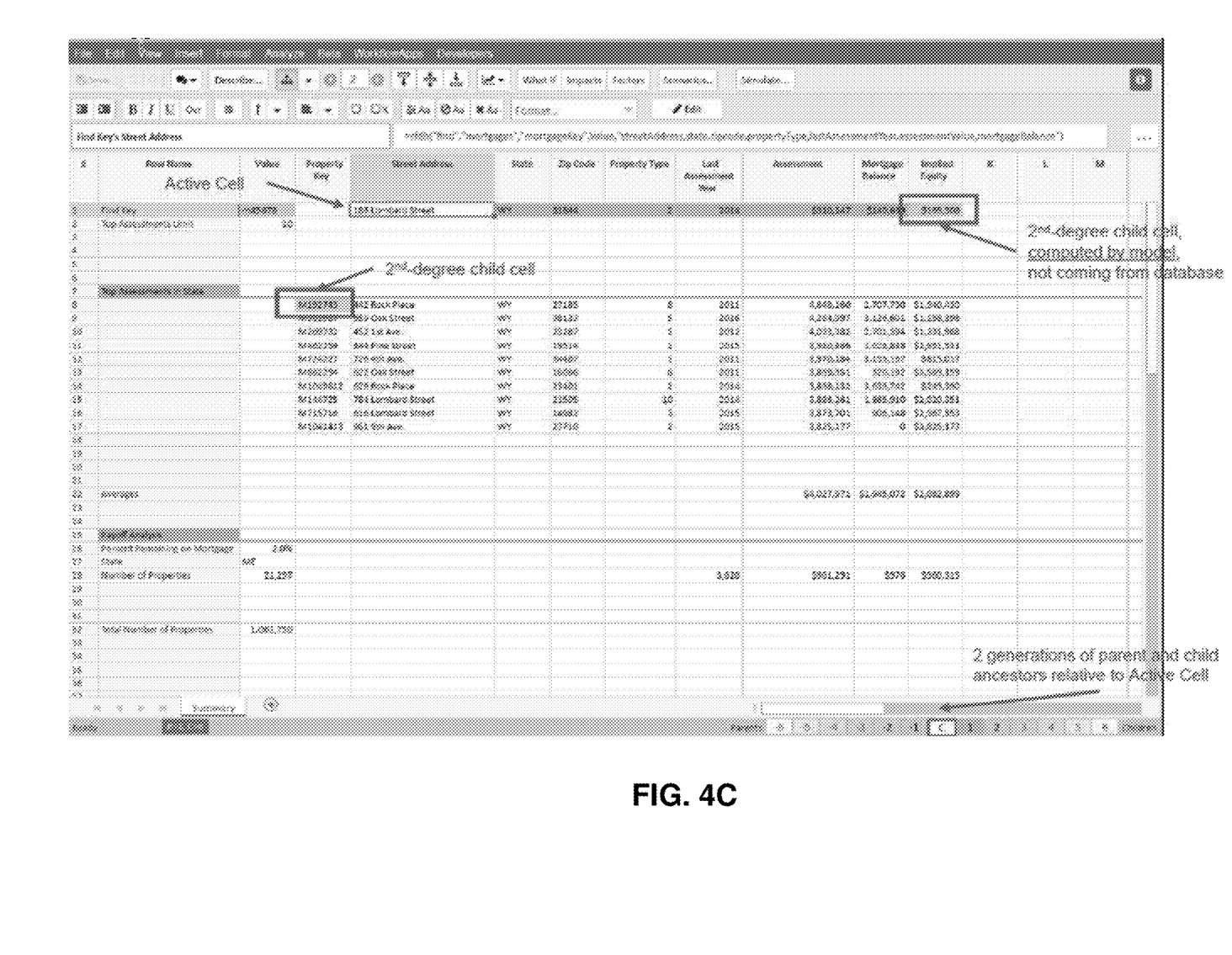

In FIG. 4C, the user has configured the user interface to highlight second-generation children and parent cells as well as the first-generation cells. In particular, there are no second-generation parent cells (the key value was entered by the user and does not depend on any other cells) and there are two second-generation children of different types. The first second-generation child cell holds a value for the implied equity associated with the identified mortgage. This can be calculated without a further database query by subtracting the mortgage balance from the assessment.

In contrast, the cell in the top-left corner of the table below the information about the identified mortgage is a second generation-child that generates another database query. In particular, this cell includes a formula that defines a query that populates the whole of the table (except for the implied equity column). This is illustrated in FIG. 4D, where third-generation children are also highlighted. The third-generation child cell uses the CFDB( ) function to query the database for N properties with the highest assessments in Wyoming (the state in which the property subject to the mortgage identified by the key value is located). Because this query returns a selected set of M attributes for each of N rows in the database, the returned results are inserted into an M by N block of cells, all of which are fourth-generation children of the selected cell (except the cell in the top-left corner of the block, which contains the function that generated the query and is this a third-generation child).

Figure 4E:
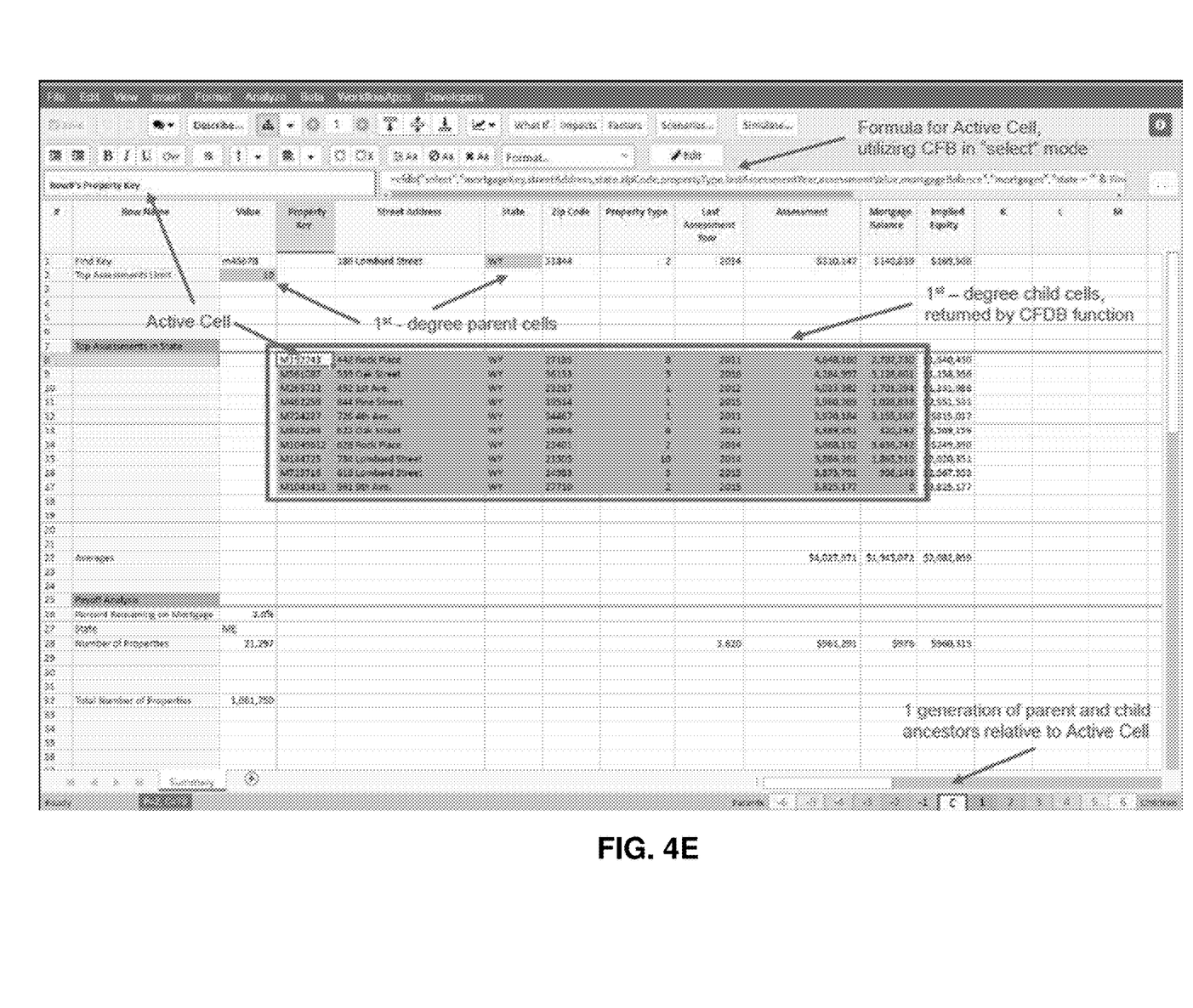

In FIG. 4E, the user has selected the cell in the top-left corner of the table. Thus, this is no the active cell and the previous fourth-generation child cells are now first-generation children and the cell indicating the state of the selected mortgage is a first-generation parent. The cell indicating what value of N (the number of properties to include in the table) is also a first-generation parent and is thus also highlighted. It can be seen in FIG. 4E that the formula in the newly selected cell uses the CFDB( ) function in select mode. In contrast to the find mode, which returns attributes from a single row, the select mode returns attributes from all rows that meet the specified requirements (in this case, the ten highest assessed properties in Wyoming).

Figure 4F:
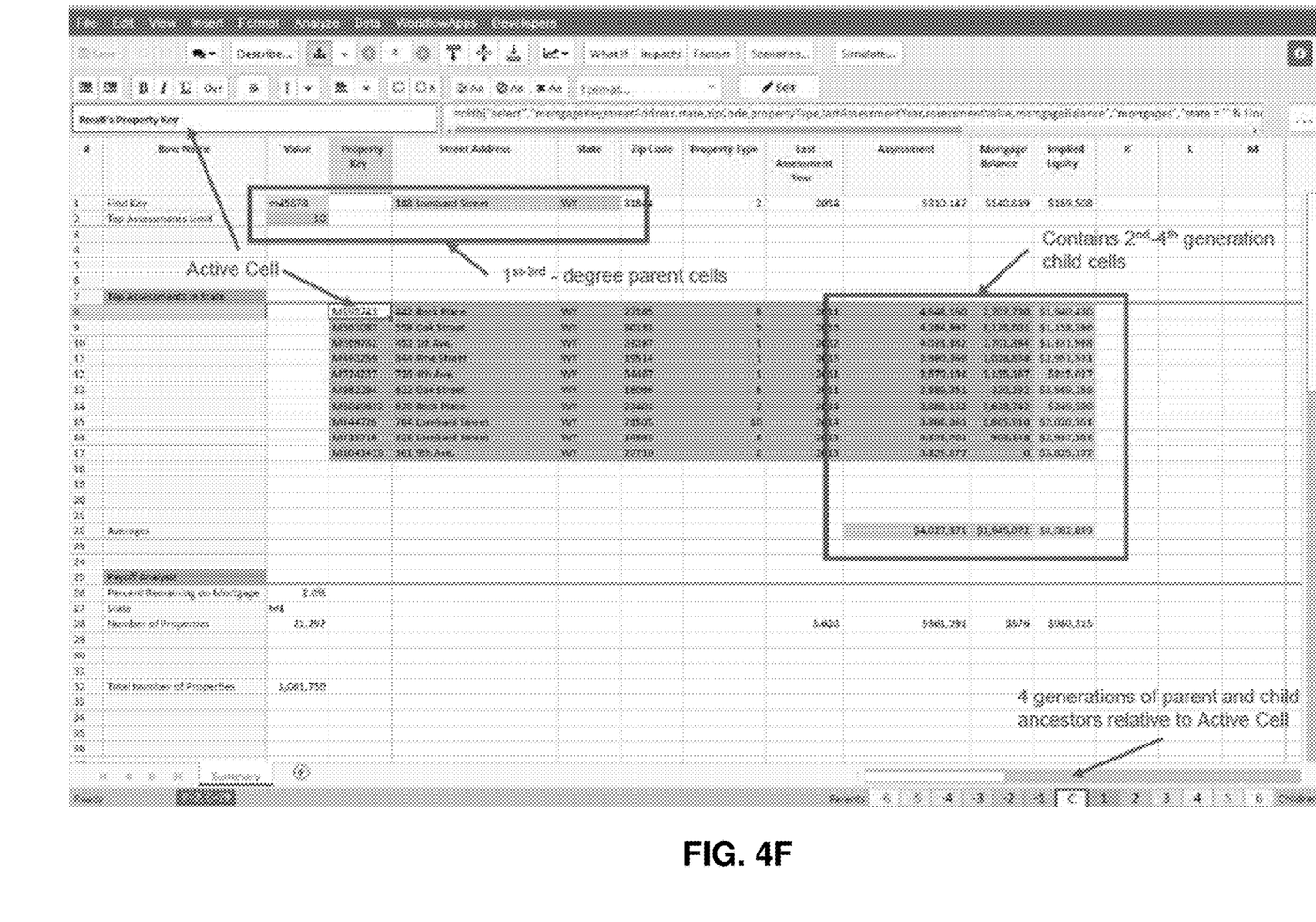

FIG. 4F illustrates four generations of parent and child cells for the newly selected active cell. This ranges from the provided key value, which is a fourth-generation parent of the active cell down to the average implied equity for the ten highest assessed properties in Wyoming, which is a fourth-generation child of the active cell. In other words, FIG. 4F illustrates highlighting of nine different levels of a dependency hierarchy, involving multiple cells for which the value is determined by a dynamic database query that is defined using the values of other cells in this spreadsheet.

Computing System Architecture

Figure 5:
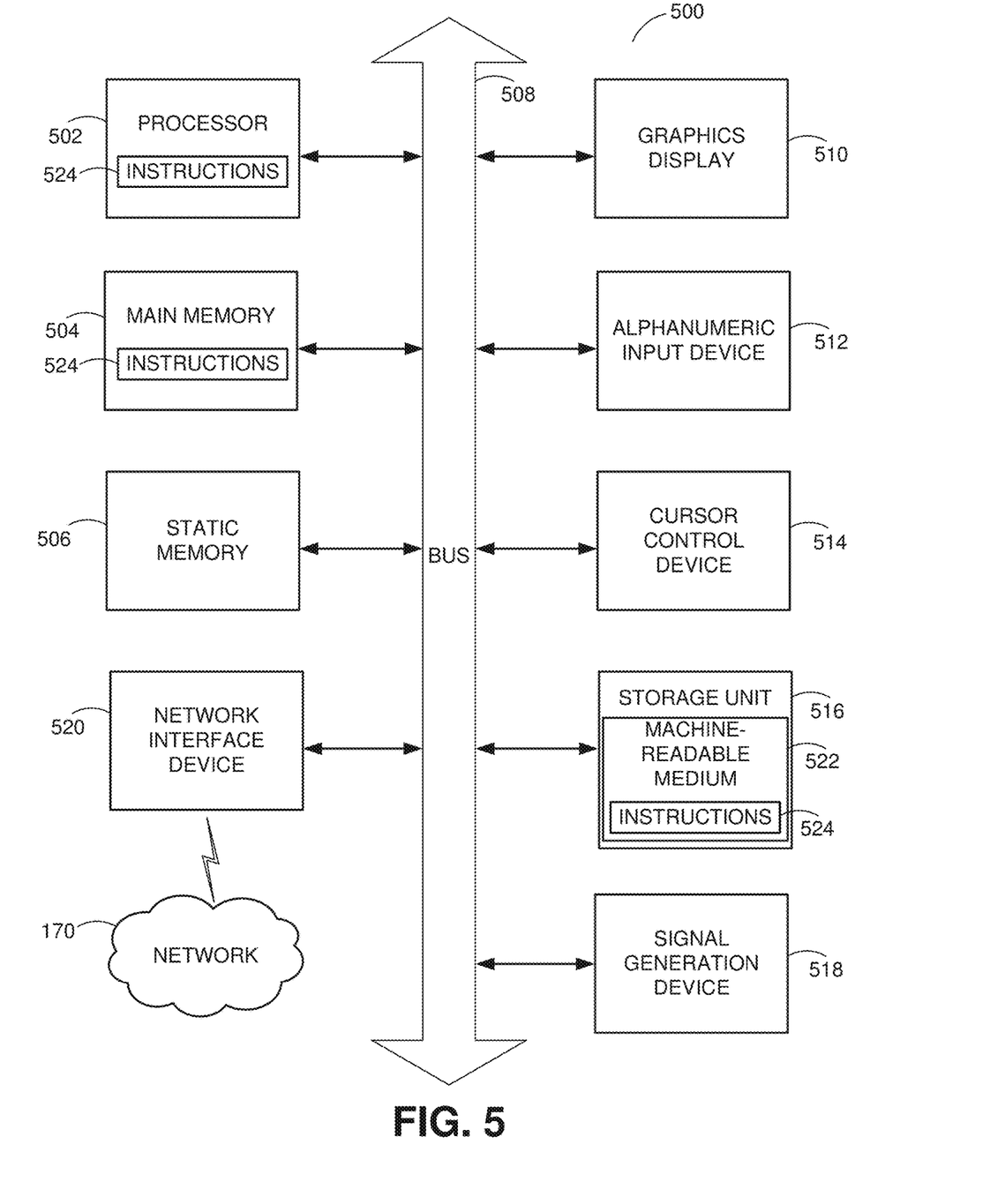
FIG. 5 is a block diagram illustrating an example of a computer suitable for use in the networked computing environment of FIG. 1, according to one embodiment.

FIG. 5 is a block diagram illustrating components of an example machine 500 able to read instructions from a machine-readable medium and execute them in a processor (or controller). Specifically, FIG. 5 shows a diagrammatic representation of a machine 500 in the example form a computer system, within which program code (e.g., software or software modules) for causing the machine to perform any one or more of the methodologies discussed above may be executed. The program code may be comprised of instructions 524 (e.g., software) executable by one or more processors 502. In alternative embodiments, the machine 500 operates as a standalone device or may be connected (e.g., networked) to other machines. In a networked deployment, the machine 500 may operate in the capacity of a server machine, a client machine in a server-client network environment, or a peer machine in a peer-to-peer (or distributed) network environment.

The machine 500 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine 500 is illustrated, the term "machine" shall also be taken to include any collection of machines that individually or jointly execute instructions 524 to perform any one or more of the methodologies discussed above.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a physical or touchscreen keyboard), a cursor control device 514 (e.g., a mouse, trackball, joystick, motion sensor, touchscreen, or other pointing instrument), a storage unit 516, a signal generation device 518 (e.g., a speaker), and a network interface device 520, which also are configured to communicate via the bus 508.

The storage unit 516 includes a machine-readable medium 522 (e.g., a non-transitory machine-readable medium) on which is stored instructions 524 embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 170 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

The types of computers used by the entities of FIGS. 1 and 2 can vary depending upon the embodiment and the processing power required by the entity. For example, the database 120 might be implemented as a distributed system comprising multiple blade servers working together to provide the functionality described. Furthermore, the computers can lack some of the components described above.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process of providing an arbitrarily deep hierarchy of dynamic database queries within a spreadsheet. Thus, while particular embodiments and applications have been illustrated and described, it is to be understood that the described subject matter is not limited to the precise construction and components disclosed. The scope of protection should be limited only by the following claims.

What is claimed is:

1. A method of updating a spreadsheet using a dynamic database query, the method comprising:

receiving a request to update an initial query cell in the spreadsheet, the request including an initial value or initial formula for the initial query cell that corresponds to an initial data source query;

updating the initial query cell to include the initial value or initial formula;

identifying a plurality of additional cells that depend on the initial query cell, the plurality of additional cells comprising:

a subsequent query cell, and a set of result cells comprising at least a first group and a second group;

obtaining a dependency hierarchy for the plurality of additional cells, the obtaining comprising accessing a pre-existing calculation graph for the spreadsheet, the pre-existing calculation graph indicating dependencies between cells, and wherein the dependency hierarchy identifies that:

the first group of results cells depends on the initial query cell, the first group of results cells are first-generation child cells, the subsequent query cell depends on the first group of results cells, and the second group of results cells depends on the subsequent query cell;

updating the plurality of additional cells according to the dependency hierarchy, wherein the updating comprises:

dynamically defining the initial data source query using the initial value and the initial formula in the initial query cell, automatically updating the first group of results cells with current values resulting from the initial data source query, determining, using the dependency hierarchy, at least one cell of the second group of results cells in the plurality of additional cells is a second generation child cell dependent on the first group of results cells;

dynamically defining a subsequent data source query in the subsequent query cell using current values in the automatically updated first group of results cells, and automatically updating the determined at least one second generation child cell in the second group of results cells with current values resulting from the subsequent data source query; and providing the spreadsheet for display.

2. The method of claim 1, wherein a server performs the method, the request is received by the server from a client device, and the spreadsheet is provided for display by the server to the client device.

3. The method of claim 1, wherein the initial data source query returns M attributes for each of N rows in the data source, wherein M and N are integers greater than 1, and the M attributes for each of N rows are inserted into a corresponding block of M by N cells in the spreadsheet.

4. The method of claim 3, wherein a top-left corner of the block of M by N cells is a first cell in the first group of results cells in the plurality of additional cells and the current value included in the first cell is a first parameter of the M attributes from a first row of the N rows.

5. The method of claim 1, wherein providing the spreadsheet for display comprises causing first-generation children cells of a selected cell to be displayed with highlighting relative to the selected cell, wherein the first-generation children cells are those a single level lower than the selected cell in the dependency hierarchy.

6. The method of claim 5, wherein providing the spreadsheet for display further comprises causing second-generation children cells of the selected cell to be displayed with visually distinguishable highlighting relative to the selected cell and the first-generation children cells, wherein the second-generation children cells are those two levels lower than the selected cell in the dependency hierarchy.

7. The method of claim 5, wherein providing the spreadsheet for display further comprises providing controls configured to enable a user to select a number of generations of children and parent cells to highlight and causing the selected number of generations of children and parent cells to be displayed with highlighting indicating their generation relative to the selected cell.

8. A non-transitory computer-readable storage medium comprising instructions that, when executed by a computing device, cause the computing device to perform operations including:

receiving a request to update an initial query cell in the spreadsheet, the request including an initial value or initial formula for the initial query cell that corresponds to an initial data source query;

updating the initial query cell to include the initial value or initial formula;

identifying a plurality of additional cells that depend on the initial query cell, the plurality of additional cells comprising:

a subsequent query cell, and a set of result cells comprising at least a first group and a second group;

obtaining a dependency hierarchy for the plurality of additional cells, the obtaining comprising accessing a pre-existing calculation graph for the spreadsheet, the pre-existing calculation graph indicating dependencies between cells, and wherein the dependency hierarchy identifies that:

the first group of results cells depends on the initial query cell, the first group of results cells are first-generation child cells, the subsequent query cell depends on the first group of results cells, and the second group of results cells depends on the subsequent query cell;

updating the plurality of additional cells according to the dependency hierarchy, wherein the updating comprises:

dynamically defining the initial data source query using the initial value and the initial formula in the initial query cell, automatically updating the first group of results cells with current values resulting from the initial data source query, determining, using the dependency hierarchy, at least one cell of the second group of results cells in the plurality of additional cells is a second generation child cell dependent on the first group of results cells;

dynamically defining a subsequent data source query in the subsequent query cell using current values in the automatically updated first group of results cells, and automatically updating the determined at least one second generation child cell in the second group of results cells with current values resulting from the subsequent data source query; and providing the spreadsheet for display.

9. The non-transitory computer-readable storage medium of claim 8, wherein a server performs the operations, the request is received by the server from a client device, and the spreadsheet is provided for display by the server to the client device.

10. The non-transitory computer-readable storage medium of claim 8, wherein the initial data source query returns M attributes for each of N rows in the data source, wherein M and N are integers greater than 1, and the M attributes for each of N rows are inserted into a corresponding block of M by N cells in the spreadsheet.

11. The non-transitory computer-readable storage medium of claim 10, wherein a top-left corner of the block of M by N cells is a first cell in the first group of results cells in the plurality of additional cells and the current value included in the first cell is a first parameter of the M attributes from a first row of the N rows.

12. The non-transitory computer-readable storage medium of claim 8, wherein providing the spreadsheet for display comprises causing first-generation children cells of a selected cell to be displayed with highlighting relative to the selected cell and causing second-generation children cells of the selected cell to be displayed with visually distinguishable highlighting relative to the selected cell and the first-generation children cells, wherein the first-generation children cells are those a single level lower than the selected cell in the dependency hierarchy, and the second-generation children cells are those two levels lower than the selected cell in the dependency hierarchy.

13. The non-transitory computer-readable storage medium of claim 8, wherein providing the spreadsheet for display comprises causing first-generation children cells of a selected cell to be displayed with highlighting relative to the selected cell, providing controls configured to enable a user to select a number of generations of children and parent cells to highlight, and causing the selected number of generations of children and parent cells to be displayed with highlighting indicating their generation relative to the selected cell.

14. A server comprising:
one or more processors;
a non-transitory computer readable storage medium comprising executable computer program instructions;
a spreadsheet engine configured to, when executing the computer program instructions, cause the one or more processors to:
receive a request to update an initial query cell in the spreadsheet, the request including an initial value or initial formula for the initial query cell that corresponds to an initial data source query;
update the initial query cell to include the initial value or initial formula;
identify a plurality of additional cells that depend on the initial query cell, the plurality of additional cells comprising:
a subsequent query cell, and
a set of result cells comprising at least a first group and a second group;
obtain a dependency hierarchy for the plurality of additional cells, the obtaining comprising accessing a pre-existing calculation graph for the spreadsheet, the pre-existing calculation graph indicating dependencies between cells, and wherein the dependency hierarchy identifies that:
the first group of results cells depends on the initial query cell,
the first group of results cells are first-generation child cells,
the subsequent query cell depends on the first group of results cells, and
the second group of results cells depends on the subsequent query cell;
update the plurality of additional cells according to the dependency hierarchy, wherein the updating comprises:
dynamically defining the initial data source query using the initial value and the initial formula in the initial query cell,
automatically updating the first group of results cells with current values resulting from the initial data source query,
determining, using the dependency hierarchy, at least one cell of the second group of results cells in the plurality of additional cells is a second generation child cell dependent on the first group of results cells;
dynamically defining a subsequent data source query in the subsequent query cell using current values in the automatically updated first group of results cells, and
automatically updating the determined at least one second generation child cell in the second group of results cells with current values resulting from the subsequent data source query; and
provide the spreadsheet for display; and
a data source configured to, when executing the computer program instructions, cause the one or more processors to:
receive the initial data source query and the subsequent data source query;
identify one or more results responsive to the initial data source query and the subsequent data source query, the one or more results including current values; and
return the one or more results to the spreadsheet engine in response to the initial data source query or the subsequent data source query.

* * * * *